Feb. 14, 1928.
J. B. CHARETTE ET AL
1,658,797
VACUUM PRODUCING APPARATUS
Filed Aug. 11, 1927
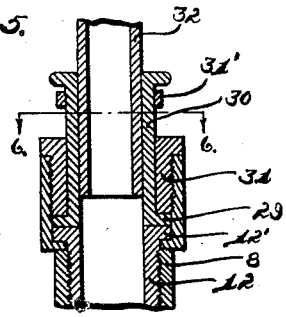
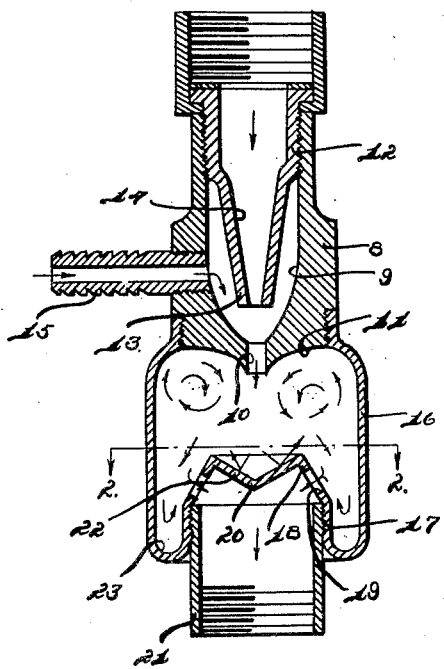
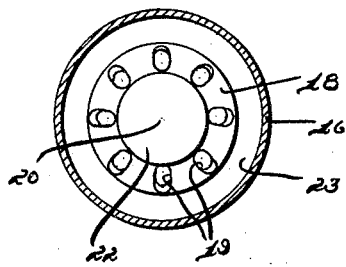
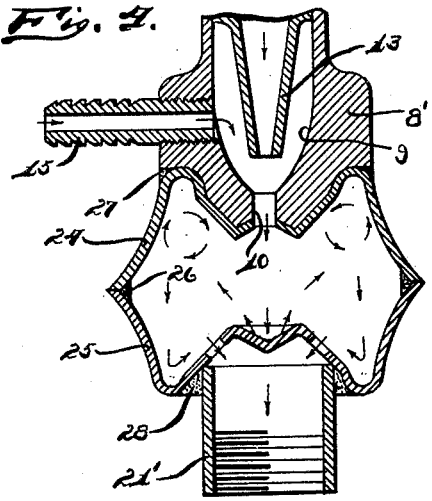
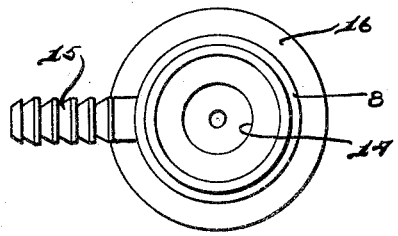
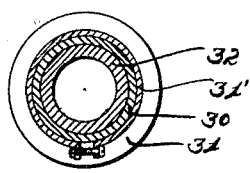
INVENTOR.
Jean B. Charette
Ernest Bernier
BY
ATTORNEY.

Patented Feb. 14, 1928.

1,658,797

UNITED STATES PATENT OFFICE.

JEAN B. CHARETTE AND ERNEST BERNIER, OF DETROIT, MICHIGAN.

VACUUM-PRODUCING APPARATUS.

Application filed August 11, 1927. Serial No. 212,249.

Our invention relates to a new and useful improvement in a vacuum producing apparatus and has for its object the provision of a device of this class which will be simple in structure, economical of manufacture and highly efficient in use.

Another object of the invention is the provision in a vacuum producing apparatus of an attaching device for attaching the apparatus to a faucet whereby the water flowing through the apparatus may be utilized for drawing air through the vacuum tube and setting up the desired vacuum.

Another object of the invention is the provision of a device of this class whereby the water when projected through the apparatus will be deflected from its natural course and caused to travel in a vortex or whirl thus mixing the water and the air together and increasing the efficiency of the device as a vacuum producing apparatus.

Other objects will appear hereinafter.

The invention consists in the combination and arrangement of parts hereinafter described and claimed.

The invention will be best understood by a reference to the accompanying drawings which form a part of this specification and in which, Fig. 1 is a central, vertical, sectional view of the invention.

Fig. 2 is a sectional view taken on line 2—2 of Fig. 1.

Fig. 3 is a top plan view of the invention.

Fig. 4 is a central, longitudinal, sectional view in fragment of a modified form of the invention.

Fig. 5 is a central, vertical, sectional view of a coupling used in the invention.

Fig. 6 is a sectional view taken on substantially line 6—6 of Fig. 5.

As shown in the drawings, the invention comprises a shell 8 having the cavity 9 formed therein which tapers to its lower end and communicates with an outlet opening 10. The lower end of the shell 8 tapers from the central opening 10 toward the sides, this lower end face 11 being curved as clearly appears from Fig. 1. Threaded in the upper end of the shell 8 is a nozzle 12 tapered to its lower end 13, the bore 14 being also tapered as shown in Fig. 1. Communicating with the cavity 9 at one side thereof is a nipple 15 which may be attached by a tube to any suitable tool or apparatus such as a massage cup in which it is desired to produce a vacuum. Threaded on the lower end of the shell 8 is a cup 16 having its bottom pressed inwardly to provide the wall 17 which extends parallel to the main wall of the cup 16. This wall terminates at its upper edge in the inwardly inclined portion 18 through which outlet openings 19 are formed. The center portion of the base is inclined toward its center and outwardly of the cup 16 as at 20. Threaded into the portion 17 is a nipple 21 to which a suitable drain conduit may be attached if desired.

In operation, when the nozzle 12 is attached to a source of water supply such as the faucet connected to a city supply of water, the water flowing through the nozzle 12 in the direction indicated by the arrow will cause the air to flow inwardly of the nipple 15 so as to be drawn with the water through the opening 10. As the water passing through the opening 10 strikes the portion 22 it will be deflected upwardly in the direction indicated by the arrows toward the upper end of the cup and there given a whirling motion from whence it will be precipitated into the space 23 and thence allowed to pass outwardly through the openings 19 into the interior of the nipple 21.

We are aware that various devices have been provided for producing a vacuum by utilizing flowing water but the specific structure of our invention which causes the water to be deflected and whirl before its passage from the cup 16 has proven to be most efficient in operation and productive of most satisfactory results.

In the modified form shown in Fig. 5 the operation is quite similar to the structure shown in Fig. 1. The formation of the member 8' is slightly modified to receive a cup made from sections 24 and 25 which are secured together at their meeting edges by solder or in any other desired manner. The upper section 25 is also secured to the member 8' by solder 27. The outlet pipe 21' is also shown as secured by the solder 28 to the lower section 25.

In Fig. 5 and Fig. 6 I have shown a coupling which may be utilized where the faucet to which the device is to be attached is not provided with peripheral threads. In this connection the structure is the same in both forms, the element 12 being provided with the flange 12', against which engages the peripheral flange 29 on the rubber sleeve 30. A jam nut 31 is used to secure this sleeve 30 in position and a clamping band 31' secures the sleeve about the plain surfaced faucet 32.

While we have illustrated and described the preferred form of our invention, we do not wish to limit ourselves to the precise details of structure shown, but desire to avail ourselves of such variations and modifications as come within the scope of the appended claims.

Having thus described our invention what we claim as new and desire to secure by Letters Patent is:

1. A vacuum producing apparatus of the class described, comprising: a shell; a liquid conducting nozzle extending into said shell and projecting below an air inlet formed therein and directed toward an outlet formed therein in one end thereof; a housing mounted on said shell, said outlet opening communicating with said housing, the base of said housing being inwardly projected and formed concave on its inner surface, and the end of said shell being formed of arcuate contour around said opening, said inwardly projected base of said housing being provided on its sides with outlet openings.

2. A vacuum producing apparatus of the class described, comprising: a shell formed cup shaped and provided with an outlet opening in its base, the walls of said shell tapering towards said opening; an air conduit communicating with said shell; a liquid conduit communicating with and projecting into said shell below said air conduit, the outlet end of said shell being formed on its outer surface concave around the outlet opening; a cup shaped member mounted on said shell and having its base projected inwardly to center, and the inwardly projecting portion of said base being formed concave, said outlet opening in said shell communicating with said cup shaped member, the inwardly projecting portion of said base being provided with outlet openings, said outlet openings being formed above the lower edge of said cup shaped member.

In testimony whereof we have signed the foregoing specification.

ERNEST BERNIER.
JEAN B. CHARETTE.